(12) United States Patent
Erdmann et al.

(10) Patent No.: US 11,098,623 B2
(45) Date of Patent: Aug. 24, 2021

(54) OIL SEPARATOR, VENTILATION SYSTEM FOR AN INTERNAL COMBUSTION ENGINE, AND INTERNAL COMBUSTION ENGINE COMPRISING SUCH AN OIL SEPARATOR

(71) Applicants: REINZ-DICHTUNGS-GMBH, Meu-Ulm (DE); 3NINE AB, Nacka Strand (SE)

(72) Inventors: Christoph Erdmann, Ulm (DE); Yagiz Yaman, Neu-Ulm (DE); Sebastian Brinker, Neu-Ulm (DE); Francesco Zitarosa, Illertissen (DE)

(73) Assignee: 3NINE AB, Nacka Strand (SE)

( * ) Notice: Subject to any disclaimer, the term of this patent is extended or adjusted under 35 U.S.C. 154(b) by 288 days.

(21) Appl. No.: 16/328,811

(22) PCT Filed: Aug. 29, 2017

(86) PCT No.: PCT/EP2017/071612
§ 371 (c)(1),
(2) Date: Feb. 27, 2019

(87) PCT Pub. No.: WO2018/041807
PCT Pub. Date: Mar. 8, 2018

(65) Prior Publication Data
US 2019/0211722 A1 Jul. 11, 2019

(30) Foreign Application Priority Data

Aug. 30, 2016 (DE) .................... 20 2016 104 754.4

(51) Int. Cl.
*B01D 41/00* (2006.01)
*F01M 13/04* (2006.01)
(Continued)

(52) U.S. Cl.
CPC ............. *F01M 13/04* (2013.01); *B01D 45/14* (2013.01); *B04B 5/12* (2013.01); *B04B 7/00* (2013.01);
(Continued)

(58) Field of Classification Search
CPC .. F01M 13/04; F01M 2013/0422; B04B 5/12; B04B 7/02; B04B 7/00; B04B 2005/125;
(Continued)

(56) References Cited

U.S. PATENT DOCUMENTS 2,104,683 A * 1/1938 Van Rosen ............ B01D 45/14
55/403
7,338,546 B2 3/2008 Eliasson et al.
(Continued)

FOREIGN PATENT DOCUMENTS

DE 102007054921 A1 2/2009
DE 102009036476 A1 5/2010
(Continued)

OTHER PUBLICATIONS

European Patent Office, International Search Report with Written Opinion, issued in PCT/EP2017/071612, dated Dec. 4, 2017, 12 pages, European Patent Office, Rijswijk, Netherlands.
(Continued)

*Primary Examiner* — Dung H Bui
(74) *Attorney, Agent, or Firm* — Mark P. Stone

(57) ABSTRACT

An oil separator for separating oil mist and/or oil droplets out of gases to be cleaned is described. A ventilation system that has the oil separator that may be used with an internal combustion engine is also described.

14 Claims, 3 Drawing Sheets

(51) Int. Cl.
    B01D 45/14    (2006.01)
    B04B 5/12     (2006.01)
    B04B 7/02     (2006.01)
    B04B 7/00     (2006.01)
    F01D 5/04     (2006.01)
    F01D 25/18    (2006.01)
(52) U.S. Cl.
    CPC .......... B04B 7/02 (2013.01); *B04B 2005/125* (2013.01); *F01D 5/048* (2013.01); *F01D 25/186* (2013.01); *F01M 2013/0422* (2013.01); *F05D 2300/43* (2013.01)
(58) Field of Classification Search
    CPC ....... B01D 45/14; F01D 5/048; F01D 25/186; F05D 2300/43
    See application file for complete search history.

(56)              References Cited

U.S. PATENT DOCUMENTS 7,875,098 B2    1/2011   Hallgren et al.
    9,322,307 B2    4/2016   Aginger
    2007/0249479 A1* 10/2007 Eliasson .................. B04B 5/12
                                                         494/43
    2011/0281712 A1  11/2011 Schlamann et al.
    2015/0068172 A1*  3/2015 Andersson Aginger .....................
                                                         B04B 5/12
                                                         55/385.3
    2017/0120176 A1*  5/2017 Ishida ................. B04B 7/14
    2019/0091618 A1*  3/2019 Ishida ................. B01D 45/14

FOREIGN PATENT DOCUMENTS

DE       102010002784 A1    9/2011
    EP            2522431 A1   11/2012
    WO        WO2006/132577 A1 12/2006

OTHER PUBLICATIONS

German Patent Office, Search Report, issued in earliest claimed German priority DE202016104754.4, dated Jul. 17, 2017, with detailed citation list and cover page of German priority, 7 pages, Munich, Germany.

* cited by examiner

OIL SEPARATOR, VENTILATION SYSTEM FOR AN INTERNAL COMBUSTION ENGINE, AND INTERNAL COMBUSTION ENGINE COMPRISING SUCH AN OIL SEPARATOR

BACKGROUND

The present invention relates to an oil separator for separating oil mist and/or oil droplets out of gases to be cleaned. It also relates to a ventilation system comprising such an oil separator, and to an internal combustion engine comprising such an oil separator and/or comprising such a ventilation system.

Oil separators are used in many sectors for separating oil mist and/or oil droplets out of gases. They are used in particular to remove to the greatest extent possible, from blow-by gases of an internal combustion engine, engine oil that is contained therein in the form of oil mist and/or oil droplets. The blow-by gases that have been largely cleaned of oil mist and/or oil droplets are then usually fed back into the intake tract of the internal combustion engine.

Where cleaned gases are mentioned below, this means gases which have been cleaned of the majority of the oil mist and oil droplets. An improvement in the cleaning effect is achieved for example by the present invention.

Use is made in particular of oil separators comprising a separation chamber, through which the gases to be cleaned flow. In particular, use is made of so-called active oil separators, in which an actively driven separating element, for example a disc separator, is arranged within the separation chamber. Such a separating element, such as a disc separator for example, is rotatably mounted and is rotated at high speed in order to separate oil mist and/or oil droplets out of the gas flowing between the individual discs of the disc separator.

Such disc separators are driven via a drive element which is mounted in a drive chamber, separate from the separation chamber, and which is driven for example by means of the oil pressure of the engine oil. The drive element and the disc separator are usually connected via a shaft. A partition wall is arranged between the separation chamber and the drive chamber, which partition wall has a seal with respect to the shaft, for example a labyrinth seal. The labyrinth seal usually has two sealing elements, wherein an outer rotationally symmetrical sealing element is fixedly connected to the housing, for example via the partition wall, and an inner rotationally symmetrical sealing element is fixedly connected to the shaft. On the mutually facing abutting edges, the two sealing elements usually have complicated structures which engage in one another in an alternating fashion, so that a route involving multiple changes in direction is created between the sealing elements. Therefore, in any rotational state of the shaft, the labyrinth seal forms a barrier for the oil contained in the drive chamber, said barrier acting substantially in the axial direction of the shaft. Since the complicated sealing structures used in the prior art usually have undercuts, these require expensive manufacturing tools and are also very complicated to install.

Particularly in the case of a drive element which is driven hydraulically by the engine oil, or if the oil that has been separated out is conducted back into the crankcase via the drive chamber, both the gas inlet of the separation chamber and the drive chamber are connected to the crankcase. In this case, the pressure conditions are influenced both by the volume flows of the blow-by gas and by the rotation of the separating element. The two variables cannot be separated in practice, but should be considered separately here for the sake of better understanding. If the rotation of the separating element is considered in isolation, a higher pressure is obtained at the gas outlet of the separating element than at the gas inlet thereof. If the blow-by gas volume flow is considered in isolation, the pressure at the gas inlet of the separation chamber increases substantially exponentially with the volume flow. An increasing volume flow thus counteracts the pressure difference of the rotating separator. This pressure difference substantially also acts between the drive chamber and the gas outlet of the separation chamber, since the drive chamber is connected to the crankcase. If the volume flow increases very significantly, the pressure thereof can outweigh the pressure difference at the separator; this also results in a reversal of the pressure conditions between the drive chamber and the gas outlet of the separation chamber, so that oil which has already been separated out and discharged into the drive chamber, and optionally drive nil from the drive chamber, can pass through the labyrinth seal and into the separation chamber (so-called oil entrainment).

Other operating states of the active oil separator are also conceivable, in which the pressure conditions between the drive chamber and the separation chamber are so unfavourable that oil can be sucked from the drive chamber into the separation chamber.

Another problem of known active oil separators lies in the cost and in the large number of operating steps necessary in order to manufacture the many components of the oil separator, in particular including the complex manufacture and installation of labyrinth seals having a complicated construction.

SUMMARY

The object of the present invention is therefore to provide an oil separator having an improved seal between the drive chamber and the separation chamber, which at the same time can be manufactured and installed in an easier and less expensive manner and in fewer operating steps. It is also an object of the present invention to provide a ventilation system and also an internal combustion engine comprising such an oil separator.

This object is achieved by the oil separator according to the claims. Advantageous developments of the oil separator according to the invention are given in the dependent claims.

The oil separator according to the invention comprises a housing, in which a separation chamber is arranged, wherein the separation chamber has an inlet for gases and an outlet for the gases, and wherein a disc separator for separating oil mist and/or oil droplets out of the gases is rotatably arranged in the separation chamber. Also arranged in the housing is a drive chamber, in which a drive element is arranged. The separation chamber and the drive chamber are separated from one another by means of a partition wall. The oil separator additionally comprises a shaft which extends through a through-opening in the partition wall from the drive chamber to the separation chamber and which rotatably connects the drive element to the disc separator. In other words, the shaft extends through a through-opening in the partition wall from the drive chamber to the separation chamber and connects the drive element to the separating element, that is to say to the disc separator, so that these can rotate with one another without moving relative to one another. A seal is arranged between the partition wall and the shaft, said seal comprising two sealing elements which cooperate to seal a region running around the shaft, of which a first sealing element is arranged on the partition wall along the circumferential edge of the through-opening and a second sealing element is connected to the shaft. The partition wall thus forms a carrier for the first sealing element and the shaft forms a carrier for the second sealing element. The oil separator according to the invention is furthermore characterized in that the shaft has a casing made of plastic, which at least in part forms the disc of the disc separator adjacent to the partition wall and continues into the sealed region, and in that the second sealing element is arranged on the casing.

Since the casing at the same time forms, at least in part, the disc adjacent to the partition wall, that is to say the lowermost disc, the lowermost disc and the casing can be manufactured in a joint operating step, thereby saving time and costs. In addition, an improved sealing effect can be achieved as a result of the sealing element being arranged on the casing made of plastic.

In one advantageous embodiment of the invention, the second sealing element is formed in one piece with the casing or is connected to the casing in a materially bonded manner. In particular, in the sealed region, either the casing itself may be formed as the second sealing element or the second sealing element may be injection-moulded onto the casing. In addition, the casing may also be formed entirely in one piece with the lowermost disc of the disc separator or may be connected to the lowermost disc in a materially bonded manner. By virtue of such a one-piece design of the casing, the lowermost disc and/or the second sealing element, the manufacture of the second sealing element and/or of the lowermost disc can take place in a joint operating step with the manufacture of the casing, thereby saving manufacturing time and costs. Alternatively, however, it is also conceivable that the second sealing element and the casing are formed as separate individual parts.

Furthermore, the first sealing element may be formed in one piece with the partition wall or may be connected to the partition wall in a materially bonded manner. In particular, in the sealed region, either the partition wall itself may be formed as the first sealing element or the first sealing element may be injection-moulded onto the partition wall. By virtue of such a one-piece design, the manufacture of the first sealing element can take place in a joint operating step with the manufacture of the partition wall, thereby saving manufacturing time and costs. Alternatively, however, it is also conceivable that the first sealing element and the partition wall are formed as separate individual parts.

In a further advantageous embodiment of the invention, the casing may be injection-moulded directly onto the shaft in the region of the second sealing element.

Alternatively, the casing in the sealed region may also be spaced apart from the shaft. In this case, a spacing between the casing and the shaft of 0.3 to 5 mm, in particular 1 to 3 mm, is advantageous. A spacing between the casing and the shaft enables a tolerance compensation for manufacturing inaccuracies.

The first sealing element and the second sealing element may be made of different materials, wherein one of the sealing elements may be made of a thermoplastic and the other of the sealing elements may be made of a thermoplastic elastomer or an elastomer. The sealing element made of elastomer can adapt to the other sealing element and lock better therewith. Furthermore, the sealing element made of elastomer also offers a greater scope for play during installation, whereas the sealing element made of thermoplastic helps to achieve the necessary inherent rigidity.

In one preferred embodiment of the invention, the first sealing element and the second sealing element may form a labyrinth seal. In the case of a labyrinth seal, there is obtained between the sealing elements a route from the drive chamber to the separation chamber which is long in comparison to the direct route and which undergoes multiple changes in direction. The labyrinth seal thus forms an effective barrier for the oil contained in the drive chamber, thereby preventing oil from passing through the labyrinth seal as a result of oil entrainment.

In another advantageous embodiment of the invention, the first and the second sealing element each have at least two sealing lips which run around the shaft and which mesh with one another. In particular, the first sealing element may have three sealing lips and the second sealing element may have two sealing lips, or the first sealing element may have two sealing lips and the second sealing element may have three sealing lips. The sealing lips may have a rectangular cross-section or a rounded shape. The extension of the sealing lips in a direction perpendicular to the direction of projection thereof depends on the overall size of the oil separator. For an individual sealing lip, it may be for example between 1.5 and 5 mm, wherein not all sealing lips must have the same extension. The length of the sealing lips in the direction of projection is usually somewhat greater than the extension in the direction perpendicular thereto. Advantageous lengths are between 2 and 7 mm, wherein the length of the first sealing elements is preferably equal to or smaller than the length of the second sealing elements. The sealing lips extend the route between the sealing elements from the drive chamber to the separation chamber and thus increase the barrier between the drive chamber and the separation chamber.

The first and the second sealing element may, have various orientations. For example, they may extend substantially perpendicular, i.e. radial, to the shaft axis or along the partition wall, so that the sealing gap between the drive chamber and the separation chamber extends substantially radially, that is to say that the two end regions of the sealing gap with respect to the drive chamber and with respect to the separation chamber are indirectly adjacent to one another in a direction radial to the shaft axis. An arrangement of the sealing elements such that the sealing gap between the drive chamber and the separation chamber extends substantially parallel to the axis of the shaft is also possible, that is to say that the two end regions of the sealing gap with respect to the drive chamber and with respect to the separation chamber are indirectly adjacent to one another in a direction parallel to the shaft axis. Non-linear orientations, orientations at an angle to the shaft axis, or other orientations, are also possible.

Furthermore, the intermeshing sealing lips of the first and second sealing element may correspondingly extend parallel to the shaft axis, that is to say may engage in one another parallel to the shaft axis. It is also possible that these sealing lips extend in a direction radial to the shaft axis, that is to say engage in one other in a direction radial to the shaft axis.

The drive element of the oil separator according to the invention may be rotatably mounted in the drive chamber. Specifically, the drive element may be a hydraulically driven, in particular oil-driven, drive element, in particular a turbine or an impeller in combination with a stationary nozzle. The mounting may take place for example via a sliding bearing in the drive chamber, so that the position of the drive element and of the shaft is precisely defined. Other bearings are of course possible.

In addition, the oil separator according to the invention may have a device, arranged in the drive chamber, for generating a vacuum which acts on the sealed region, in particular an impeller for generating a vacuum, which is arranged preferably between the drive element and the partition wall and/or preferably on the drive element. The vacuum generated in the drive chamber prevents oil, lubricating oil or engine oil, which has already been separated out and discharged into the drive chamber and which is used for the drive in the drive chamber, from being sucked into the separation chamber. The impeller for generating a vacuum may be driven by means of the shaft or the turbine. In the latter case, the impeller for generating a vacuum may be arranged directly on the turbine.

The present invention also includes a ventilation system for blow-by gases of an internal combustion engine, comprising a ventilation line between the crankcase and the intake tract of the internal combustion engine, wherein an above-described oil separator is arranged in the ventilation line.

The present invention additionally includes an internal combustion engine comprising a crankcase and an intake tract, wherein an above-described ventilation system is arranged between the crankcase and the intake tract.

Some examples of oil separators according to the invention will be described below with reference to figures. Identical or similar reference signs will be used for identical or similar elements, and therefore the description of the reference signs will in some cases not be repeated. Besides the essential features of the present invention according to claim 1, the following examples show in each case a plurality of optional developments in combination with one another. However, it is also possible to develop the present invention by just one of the optional features in each case, or to develop the invention by a combination of the illustrated optional features within one example or else a combination of different optional features in different examples.

BRIEF DESCRIPTION OF THE DRAWINGS

In the figures.

DETAILED DESCRIPTION

Figure 1:
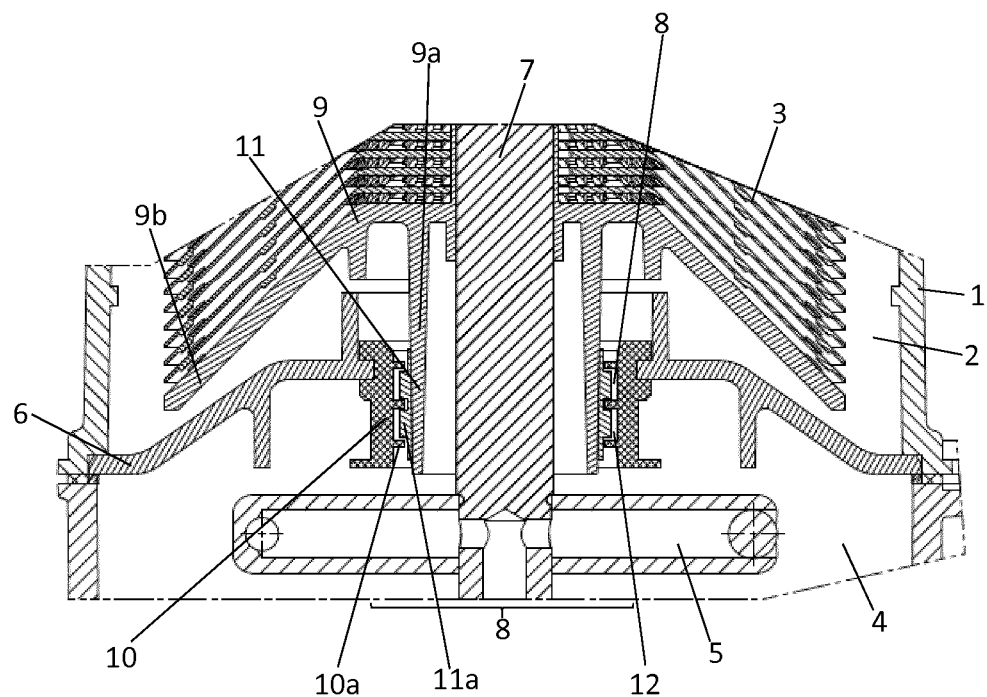
FIG. 1 shows a vertical section through an oil separator according to the invention, according to a first exemplary embodiment.

FIG. 1 shows a vertical section through an oil separator according to the present invention. This oil separator is provided with a housing 1 and with a separation chamber 2 having a disc separator 3, the disc separator 3 being driven by a shaft 7. Provided adjacent to the separation chamber 2 is a drive chamber 4, in which a turbine, as a drive element 5, is arranged on the same shaft 7 as the disc separator 3. The turbine 5 is driven by the oil pressure of the engine oil and in turn drives the disc separator 3. The drive oil is supplied in the conventional manner through a central bore in the shaft 7, which is supplied with drive oil via the bearing of the shaft 7 in the drive chamber 4. The separation chamber 2 and the drive chamber 4 are arranged in the common housing 1 and are separated from one another via a partition wall 6 which runs substantially horizontally to the shaft 7. The shaft 7 has, between the disc separator 3 and the turbine 5, a casing 9a which in this section is spaced apart from the shaft 7. In the direction towards the disc separator 3, the casing 9a transitions into the lowermost disc 9b of the disc separator 3 in the region 9. At the point where the shaft 7 passes through the partition wall 6, the partition wall 6 has a through-opening 8, in which a seal 10, 11, for example a labyrinth seal, is arranged, said seal sealing between the drive chamber 4 and the separation chamber 2. The seal 10, 11 comprises a first sealing element 10 made of a thermoplastic, which is arranged on the partition wall 6, and a second sealing element 11 made of an elastomer, which is arranged on the casing 9a of the shaft 7. The sealing elements 10 and 11 meet one another at a contact area 12 running concentrically around the casing 9a. The first sealing element 10 furthermore has three sealing lips 10a of rectangular cross-section which face towards the second sealing element 11. In a corresponding manner, the second sealing element 11 has two sealing lips 11a of rectangular cross-section which face towards the first sealing element 10, so that the sealing lips 10a and 11a engage in one another. The engagement takes place in a direction perpendicular to the axis of rotation of the shaft 7. The seal 10, 11 is a labyrinth seal, in which the contact area 12 between the sealing elements 10 and 11 and the route through the seal is increased in order to obtain a better sealing effect. Because the casing 9a of the shaft protrudes into the through-opening 8, there is no need for a separate mount for the second sealing element 11, thereby saving operating steps and costs in the manufacture of the oil separator.

Figure 2:
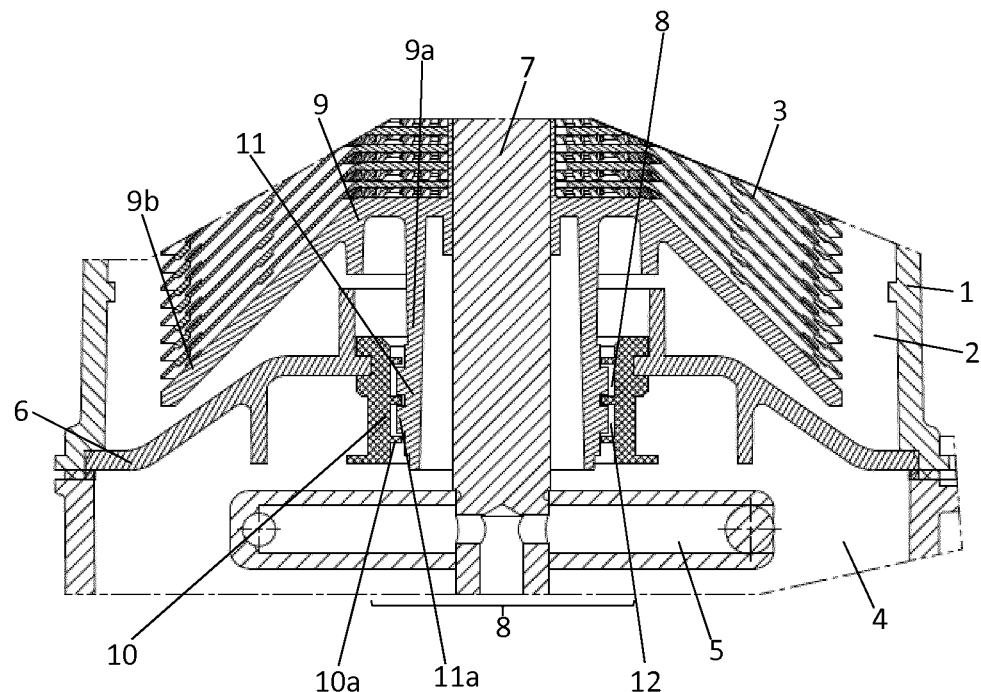
FIG. 2 shows a vertical section through an oil separator according to the invention, according to a second exemplary embodiment.

FIG. 2 shows a vertical section through a further exemplary embodiment of the oil separator according to the invention. The oil separator in FIG. 2 differs from the oil separator in FIG. 1 only in that the second sealing element 11 is formed in one piece with the casing 9a of the shaft 7. In this case, the second sealing element 11 can be manufactured directly in one operating step with the casing 9a and the lowermost disc 9b.

Figure 3:
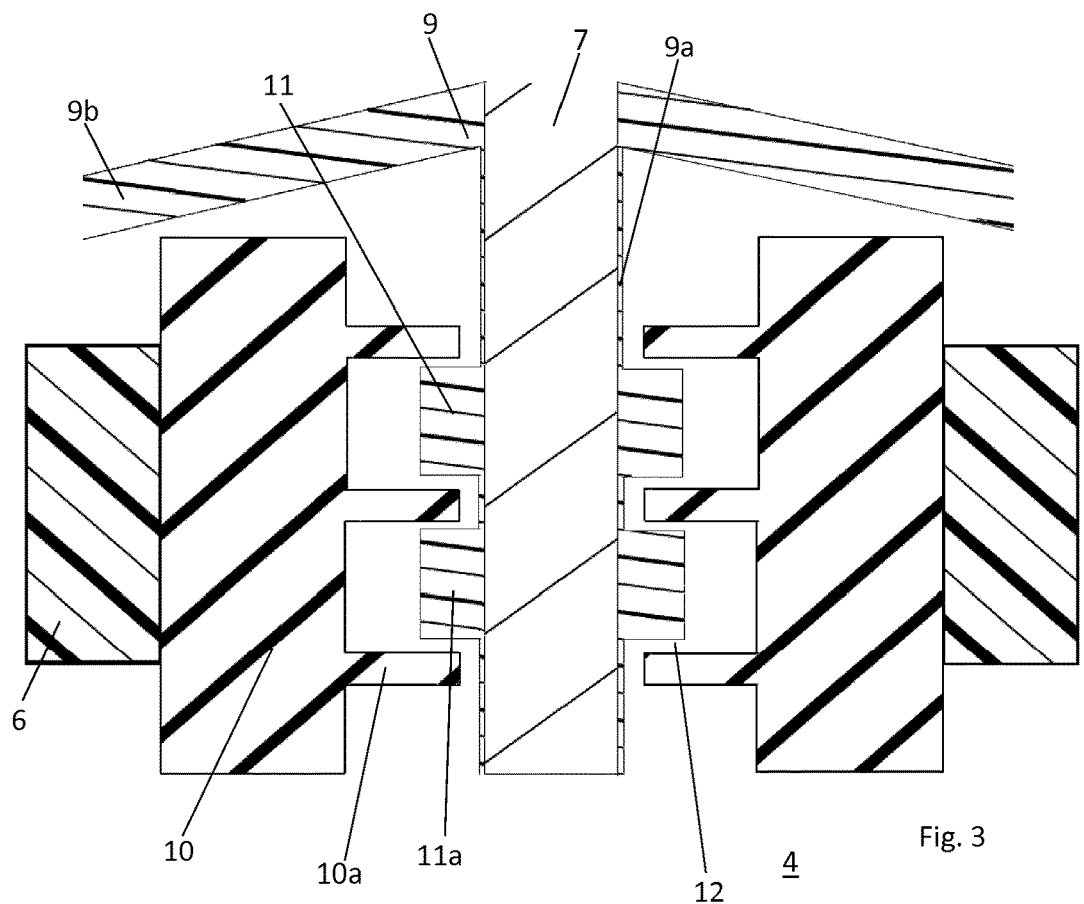
FIG. 3 shows a vertical section through an oil separator according to the invention, according to a third exemplary embodiment.

FIG. 3 shows a highly schematic vertical section through a further exemplary embodiment of the oil separator according to the invention. The oil separator in FIG. 3 differs from the oil separator in FIG. 2 in that, over the entire sealing region, the casing 9a is arranged on the shaft 7 directly, i.e. without a spacing, or is injection-moulded directly onto the shaft 7. In FIG. 3, the turbine is not shown and the sealing gaps are shown on a considerably enlarged scale for the sake of better illustration.

Figure 4:
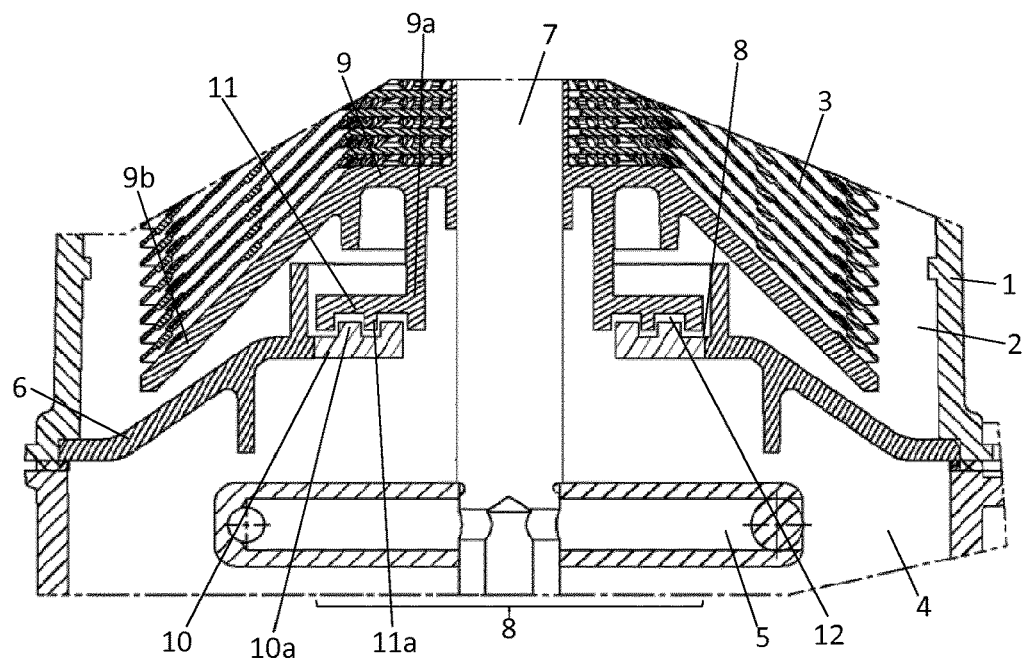
FIG. 4 shows a vertical section through an oil separator according to the invention, according to a fourth exemplary embodiment.
Figure 5:
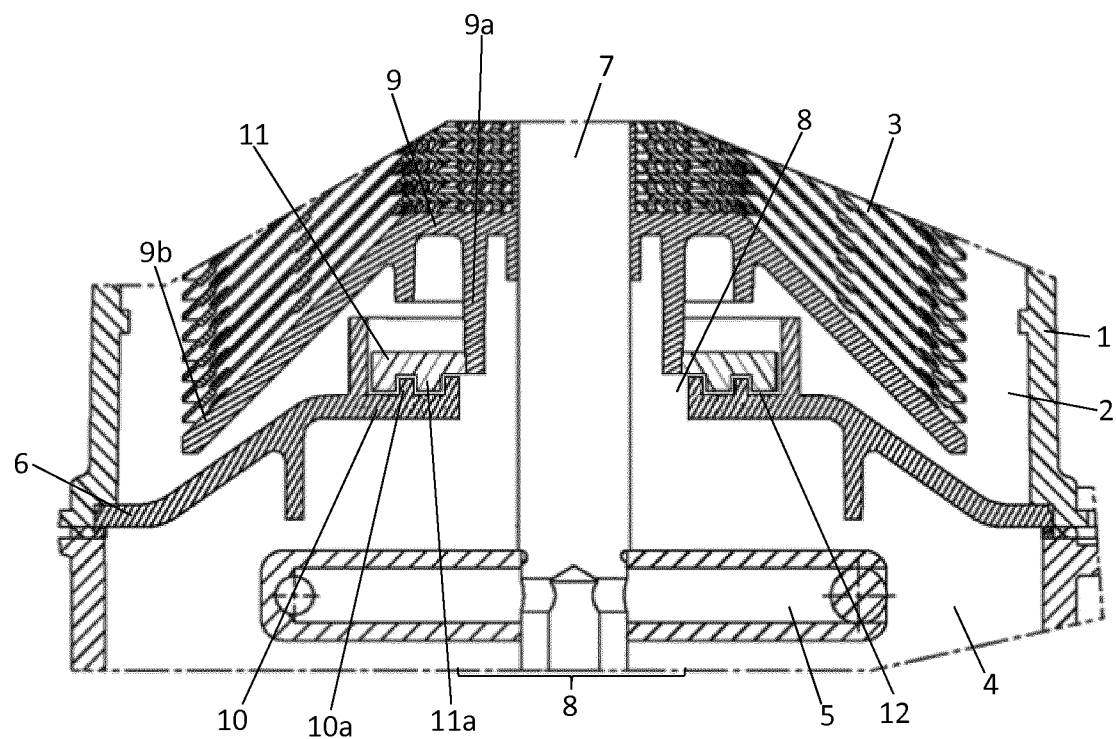
FIG. 5 shows a vertical section through an oil separator according to the invention, according to a fifth exemplary embodiment.

FIG. 4 shows a vertical section through a further exemplary embodiment of the oil separator according to the invention. The oil separator in FIG. 4 differs from the oil separators of FIGS. 1 to 3 in that the contact area 12 extends perpendicular to the axis of rotation of the shaft 7. The second sealing element 11 is positioned above the contact area 12, that is to say facing towards the disc separator 3 in relation to the direction of extension of the shaft, is formed in one piece with the casing 9a and has three sealing lips 11a. The first sealing element 10 is arranged on the partition wall 6 below the contact area 12, that is to say facing towards the turbine in relation to the direction of extension of the shaft 7, and has two sealing lips 10a, which engage with the sealing lips 11*n*. In a manner differing from the previous exemplary embodiments, the sealing lips 10*a*, 11 *a* here extend parallel to the direction of extension of the shaft 7. FIG. 5 shows a vertical section through a further exemplary embodiment of the oil separator according to the invention. The oil separator in FIG. 5 differs from the oil separator of FIG. 4 in that the first sealing element 10 is formed in one piece with the partition wall 6, and in that the second sealing element 11 made of elastomer is injection-moulded onto the casing 9*a* as a separate element. The two sealing lips 10*a* of the first sealing element 10 engage with the two sealing lips 11*a* of the second sealing element 11.

Figure 6:
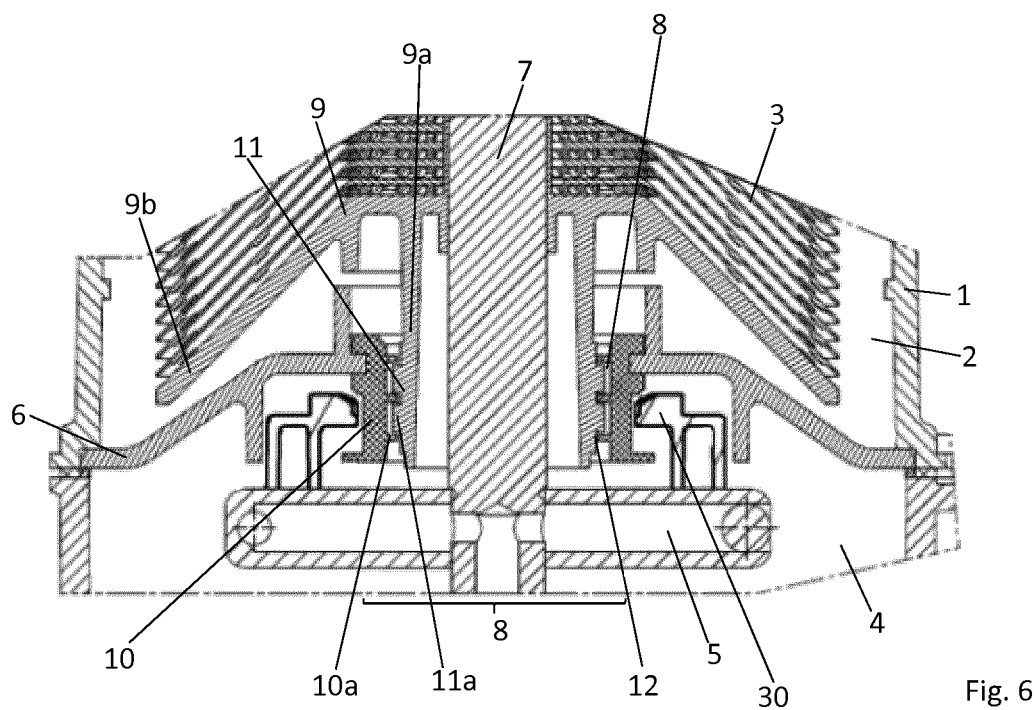
FIG. 6 shows a vertical section through an oil separator according to the invention, according to a sixth exemplary embodiment.

FIG. 6 shows a vertical section through a further exemplary embodiment of the oil separator according to the invention. The oil separator in FIG. 6 differs from the oil separator of FIG. 2 by an impeller 30 which is additionally arranged on the turbine 5, on the surface thereof that faces towards the partition wall 6. Said impeller is rotated together with the turbine 5 and then generates a vacuum in the drive chamber in the region where the shaft 7 passes through the partition wall 6, and thus prevents drive oil from being entrained out of the drive chamber and into the separation chamber.

The invention claimed is:

1. An oil separator for separating oil mist and/or oil droplets out of gases, comprising:
    a housing,
    a separation chamber which is arranged in the housing, wherein the separation chamber has an inlet for gases and an outlet for the gases, and a disc separator for separating oil mist and/or oil droplets out of the gases is rotatably arranged in the separation chamber,
    a drive chamber which is arranged in the housing and in which a drive element is arranged, wherein the separation chamber and the drive chamber are separated from one another with a partition wall,
    a shaft which extends through a through-opening in the partition wall from the drive chamber to the separation chamber and which rotatably connects the drive element to the disc separator,
    wherein a seal is arranged between the partition wall and the shaft, said seal comprising two sealing elements which cooperate to seal a region running around the shaft, of which a first sealing element is arranged on the partition wall along the circumferential edge of the through-opening and a second sealing element is connected to the shaft,
    wherein the shaft has a casing made of plastic, which at least in part forms a disc of the disc separator adjacent to the partition wall and continues into the sealed region, and in that the second sealing element is arranged on the casing,
    wherein the first and the second sealing element each have at least two sealing lips which run around the shaft and which mesh with one another.

2. The oil separator according to claim 1, wherein the second sealing element is formed in one piece with the casing or is connected to the casing in a materially bonded manner.

3. The oil separator according to claim 2, wherein in the sealed region, either the casing itself is formed as the second sealing element or the second sealing element is injection-moulded onto the casing.

4. The oil separator according to claim 1, wherein the first sealing element is formed in one piece with the partition wall or is connected to the partition wall in a materially bonded manner.

5. The oil separator according to claim 1, wherein the casing is injection moulded onto the shaft.

6. The oil separator according claim 1, wherein the casing in the sealed region is spaced apart from the shaft 0.3 to 5 mm.

7. The oil separator according to claim 1, wherein the first sealing element and the second sealing element are made of different materials, wherein one of the sealing elements is made of a thermoplastic and the other of the sealing elements is made of a thermoplastic elastomer or an elastomer.

8. The oil separator according to claim 1, wherein the first sealing element and the second sealing element form a labyrinth seal.

9. The oil separator according to claim 1, wherein the first sealing element has three sealing lips and the second sealing element has two sealing lips.

10. The oil separator according to claim 1, wherein the drive element is rotatably mounted in the drive chamber.

11. The oil separator according to claim 1, wherein the drive element is a hydraulically driven, including oil-driven, the drive element, including a turbine or an impeller in combination with a stationary nozzle.

12. The oil separator according to claim 11, wherein a device, arranged in the drive chamber, for generating a vacuum which acts on the sealed region, including an impeller for generating a vacuum, which is arranged between the drive element and the partition wall, including on the drive element.

13. The oil separator according to claim 1, wherein the first and the second sealing element are configured such that a sealing gap formed therebetween extends between the drive chamber and the separation chamber, including radial to or parallel to the axis of rotation of the shaft.

14. The oil separator according to claim 1, wherein the intermeshing sealing lips extend parallel to or radial to an axis of rotation of the shaft.

* * * * *